United States Patent [19]
Beletsky et al.

[11] Patent Number: 5,351,868
[45] Date of Patent: Oct. 4, 1994

[54] MOLDED LAMINATED POUCH

[75] Inventors: Robert J. Beletsky; Anthony G. Lefeber, both of Temecula; John J. Chase; Gary M. Paudler, both of Santa Barbara, all of Calif.

[73] Assignee: Bianchi International, Temecula, Calif.

[21] Appl. No.: 4,106

[22] Filed: Jan. 13, 1993

[51] Int. Cl.⁵ ............................................. B65D 25/04
[52] U.S. Cl. ................................. 224/245; 224/914; 224/236; 224/252; 156/220; 156/245
[58] Field of Search ............... 224/911, 912, 914, 192, 224/193, 198, 252, 246, 242, 243, 244, 245, 236, 231, 235; 385/116; 220/453, 675, 461, 902; 206/523, 594, 588, 493; 493/211, 903, 933; 264/152, 161, 257, 258, 321, 322, 324, 325; 156/245, 267, 93, 219, 209, 220

[56] References Cited

U.S. PATENT DOCUMENTS

| | | | |
|---|---|---|---|
| 2,206,078 | 7/1940 | Cunnington | 156/219 X |
| 2,946,713 | 7/1960 | Dusina et al. | 264/321 X |
| 4,101,060 | 7/1978 | Bianchi et al. | 224/193 X |
| 4,485,947 | 12/1984 | Cook | 224/911 X |
| 4,485,948 | 12/1984 | Cook | 224/243 |
| 4,846,383 | 7/1989 | Gallagher | 224/911 |

Primary Examiner—Glenn T. Barrett
Attorney, Agent, or Firm—Wagner & Middlebrook

[57] ABSTRACT

A laminated pouch includes a layer of woven synthetic fabric, a layer of polyfoam and a layer of liner material, the layers being bonded together under heat and pressure. During the molding process selected areas of the laminate material is compressed under substantial heat and pressure to permanently deform the laminate into areas of substantially less thickness than uncompressed areas, the compressed areas being of substantial stiffness. The laminate is also formed with edges, and corners of substantial stiffness. The pouch is formed of two such laminate layers which are trimmed and fastened together at the edges. The resulting pouch retains its shape well and is not significantly deformed by the weight or pressure of its contents.

15 Claims, 5 Drawing Sheets

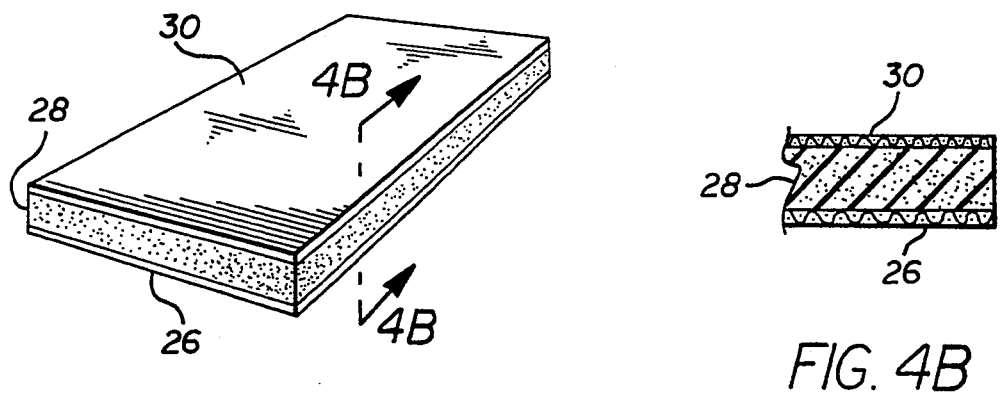
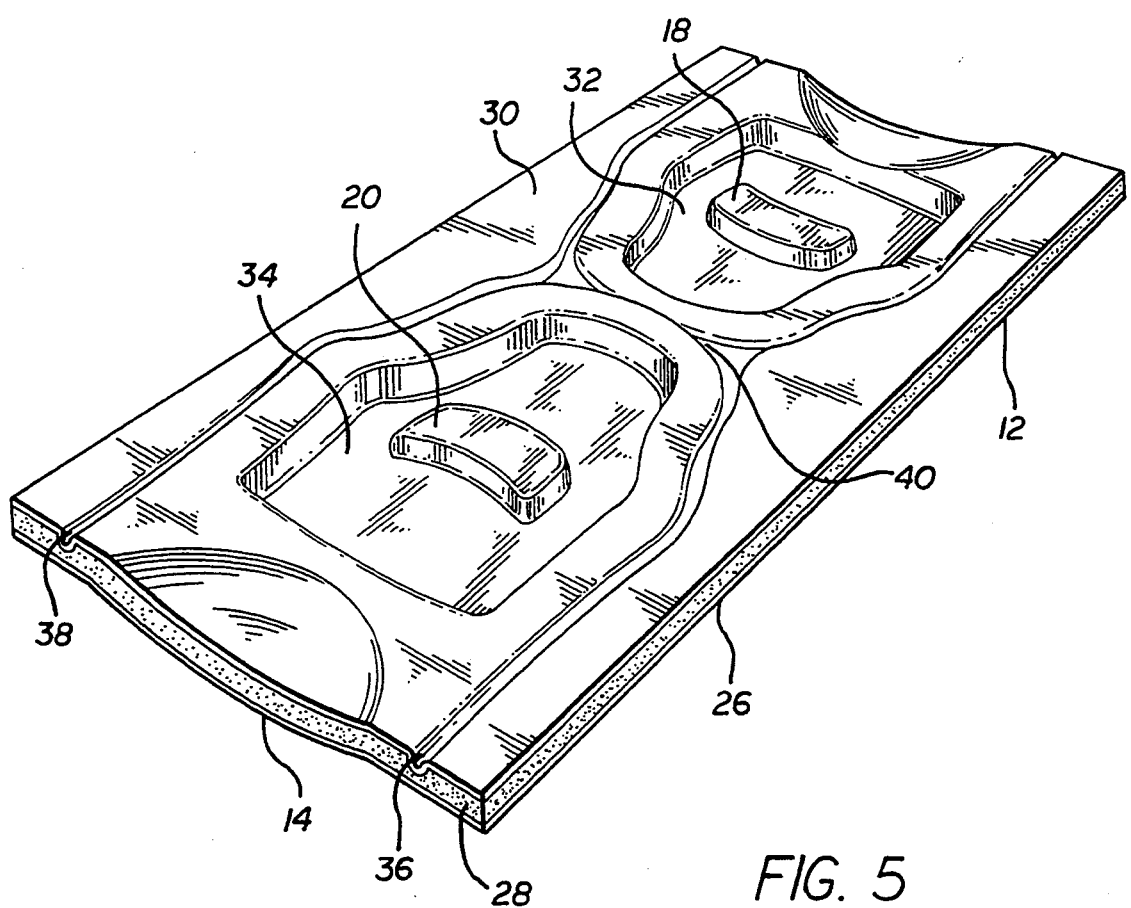

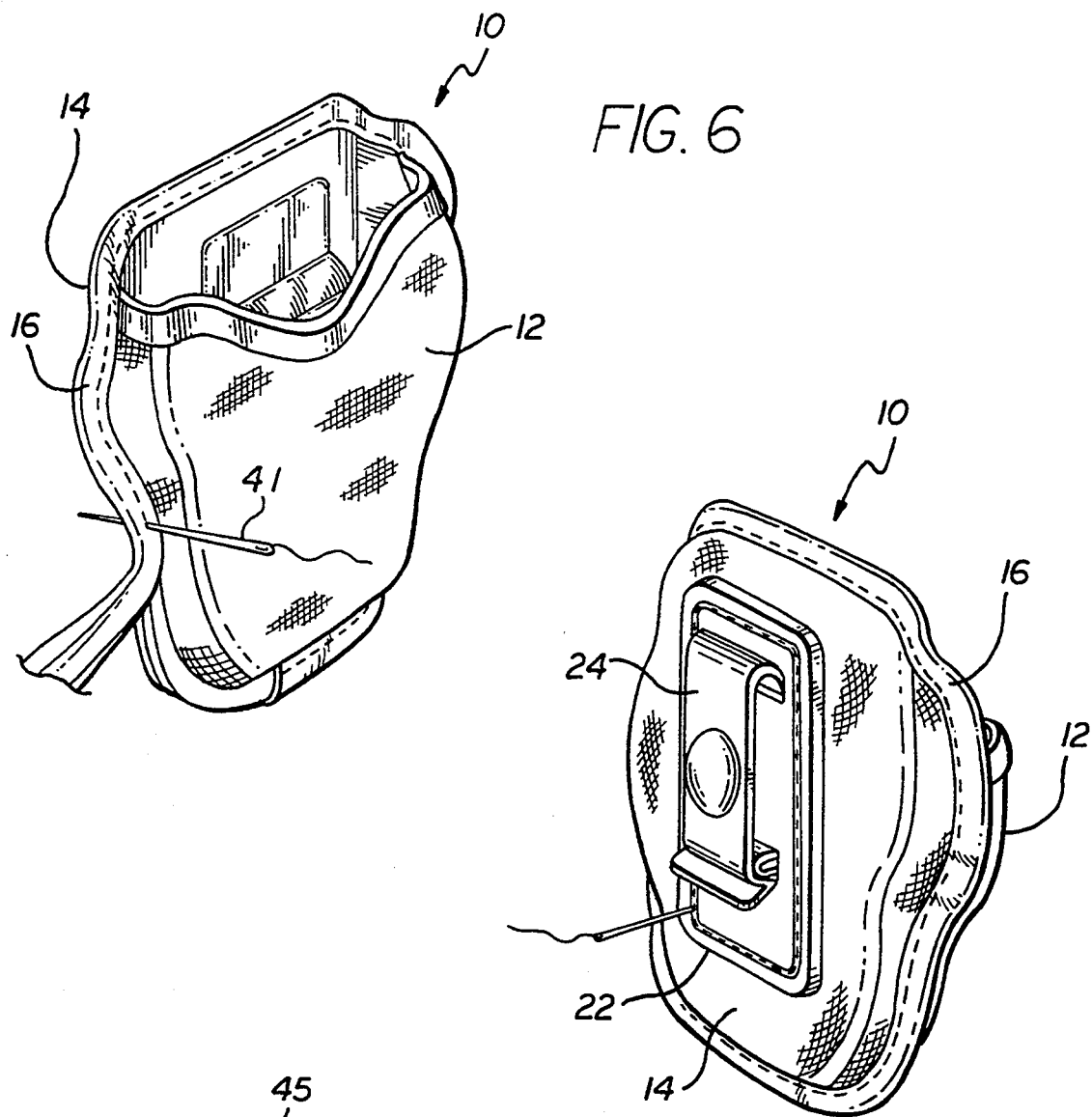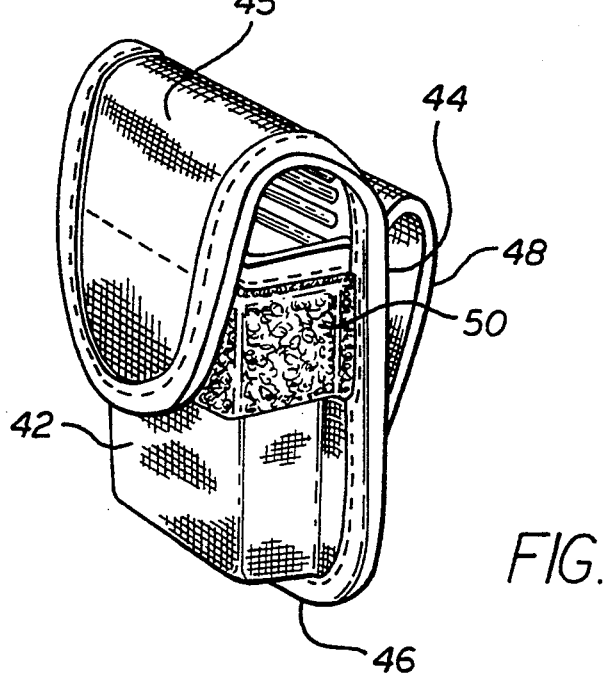

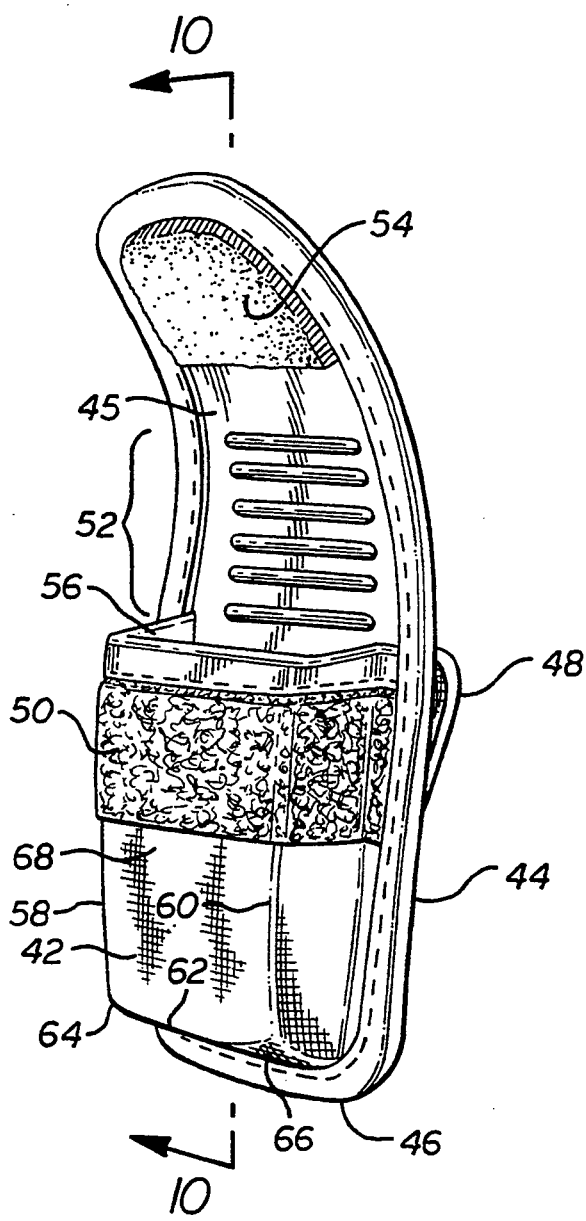
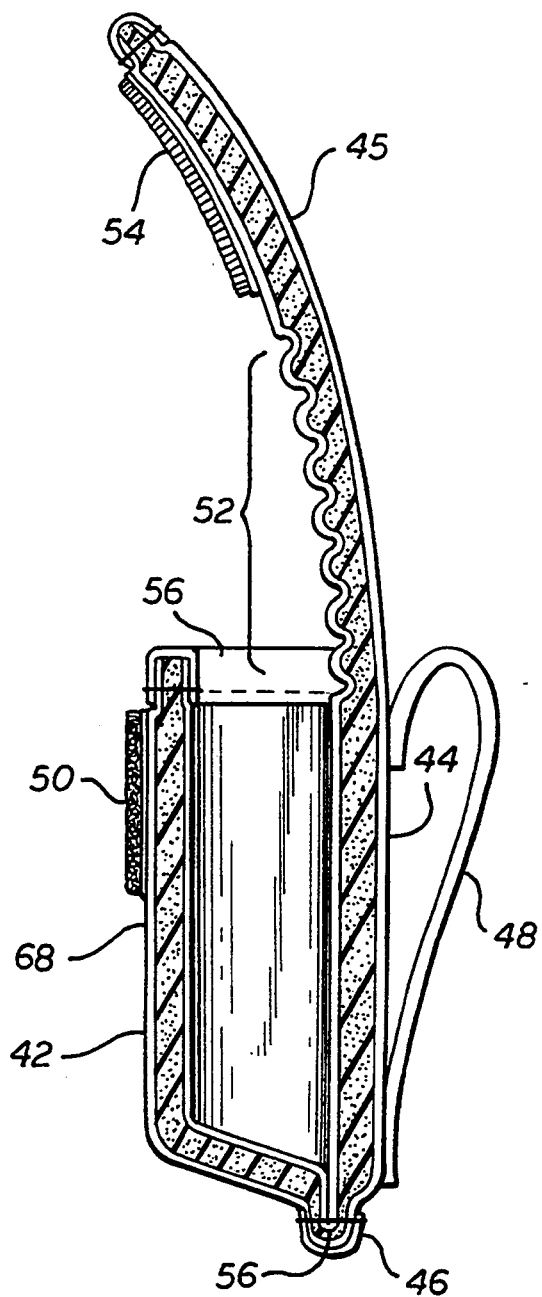
FIG. 9
FIG. 10

MOLDED LAMINATED POUCH

BACKGROUND OF THE INVENTION

As is well known, it is common practice for police officers, security officers, some military personnel, and other personnel to carry a number of items in addition to a pistol holster. Such items may include a magazine pouch for holding extra ammunition magazines for the pistol, pouches of different configuration which hold cartridges in boxes that fit into the pouch, a holder for standard mace containers, and a pouch for holding handcuffs. In the past it has been customary to fabricate such pouches of leather. Leather pouches are considered very desirable because they are durable, they have a good appearance, and they tend to conform to the shape of whatever it is that they hold. Because of this last characteristic, leather pouches are associated with a very neat and trim look, unlike a soft bag, for example, which will tend to be weighed down and deformed by its contents.

There are, however, certain disadvantages to leather pouches such as cost, susceptibility to mold or mildew, and a tendency to absorb oils and greases which cause stains detracting from their appearance. While leather pouches are not seriously harmed by some rain, they are not improved by getting very wet. And while they can be cleaned with some effort, they are not washable. Consequently, with the advent of strong woven fabrics such as ballistic nylon, many such pouches have been formed using such fabrics, frequently in the form of a laminate material in which the outside layer is of ballistic nylon, a center layer is of a thin polyfoam and an inside layer is of a lining fabric which is durable but soft such that it does not scratch or damage the finish of the article carried.

Patents teaching the fabrication and use of such laminate material are U.S. Pat. Nos. 4,485,947 and 4,485,948 to C. L. Cook.

Pouches formed of such laminate materials do tend to avoid a number of the disadvantages of leather enumerated above. They are not harmed by water and are washable. Oils and greases can be removed by washing and such pouches are quite durable. Consequently, laminated fabric pouches have been quite popular for many purposes and have been produced and sold for several years.

One recognized disadvantage of using such laminate materials for the pouches described above has been that they never have quite the neat and trim appearance that leather provides. A leather pouch can be formed to look quite box-like with relatively well defined edges and corners, whereas the typical pouch formed of laminate material does not take and retain such defined edges and corners and behaves, in general, much like a typical bag. It is, or may be, deformed by the shape of its contents. Thus there is a desire for a pouch formed of the above described laminate material but which can be given and will retain a better defined shape as do leather pouches. Such pouches would then have a trim appearance similar to a leather pouch but without the cost or the other disadvantages referred to above.

There is also a need for pouches which are made of such laminate material but in which certain permanent conformations including protrusions can be formed on the surfaces of such pouches.

SUMMARY OF THE INVENTION

Applicants have devised some new designs for pouches such as those described above using laminate materials but subjecting them to molding under heat and pressure to provide the desired stable configurations. During the molding process, certain areas of the laminate material are severely compressed such that the thickness of the polyfoam is reduced to approximately one-fifth of its original thickness, other areas are compressed to lesser amounts and still others are not compressed at all. A flat sheet of the laminate material is placed in a mold, heated to a temperature of about 250° F., certain areas are compressed as described while heated, this occurring for a desired time which will usually be about 60 seconds, after which the laminate material is cooled in the mold. The sheet is then removed from the mold which sheet normally includes two sides of the pouch which are joined at the most convenient location. The sheet is then trimmed to define the shapes of the sides. Following the trimming step, any other parts, such as belt loops or fasteners are sewed to the pouch. The sides are then folded over at the joining part and the edges stitched together, usually with an edge binding.

One such pouch incorporating the invention is formed with a substantial compression over the inside surfaces of both sides, leaving an island or projection of essentially uncompressed or slightly compressed material in the center. When these sides are folded together they form a pouch having two opposing projections leaving very little space between. This provides a handcuff pouch, one side of each cuff being forced past the projections, leaving the projections in the enter of each cuff. The cuffs are most unlikely to inadvertently fall out of the pouch since it requires a relatively strong pull to bring the captured sides of the cuffs past the projections.

Another such pouch made by the above process is a magazine pouch. This pouch is similar to that described above but without the internal projections. Since the magazines which it is desired to carry are rectangular in cross-section, it is desirable that the magazine pouch have a similar "squared off" appearance. This appearance would not result from normal fabrication of a magazine pouch by prior art methods. This particular pouch is formed with one side much longer than the other so that the longer side can function as a cover. During the molding process, one side is compressed and molded into a stiff box-like configuration with well defined edges and corners. A number of transverse grooves are molded into the cover part enabling it to operate as a sort of variable hinge, permitting magazines of different heights to be carried in the pouch. Hook and loop fastening strips are stitched to the cover and to the opposite side as a means of closing the pouch.

DESCRIPTION OF THE DRAWINGS

FIG. 4A is a perspective drawing of a piece of laminate material used to produce the embodiment of FIGS. 1-3;

FIG. 4B is a sectional view taken along line 4B—4B of FIG. 4A;

FIG. 5 is a perspective view of the laminate material of FIG. 4 after being molded to produce the embodiment of FIGS. 1-3;

FIG. 6 is a perspective view of the embodiment of FIG. 1 following trimming of the molded material of FIG. 5 and showing the two sides being stitched together with a binding;

FIG. 7 is a perspective view, primarily of the rear side of the embodiment of FIGS. 1-3 and 6 showing the belt loop panel being stitched to the pouch;

FIG. 8 is a perspective view of another embodiment of the invention;

FIG. 9 is a perspective view similar to that of FIG. 8 but showing the cover opened.

FIG. 10 is a sectional view taken along line 10—10 of FIG. 9.

DESCRIPTION OF THE PREFERRED EMBODIMENTS

Figure 1:
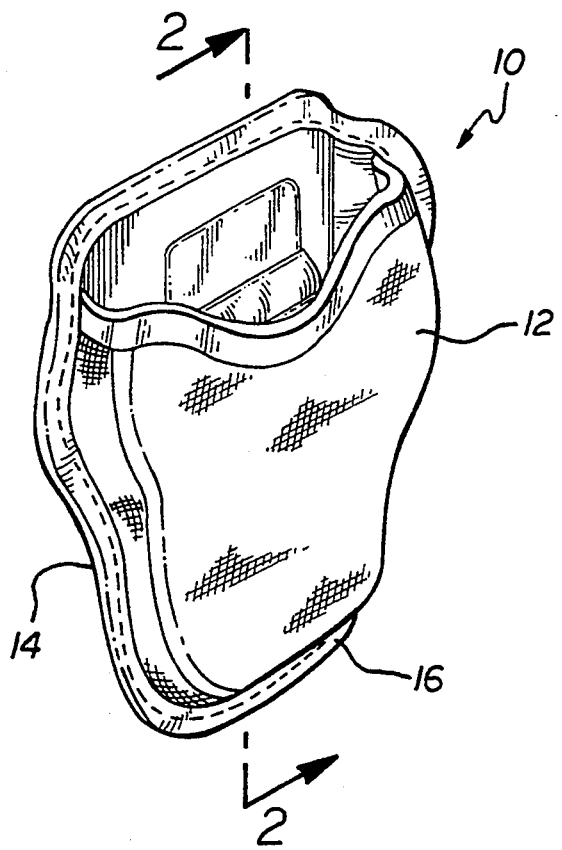
FIG. 1 is a perspective view of one embodiment of the invention.

Referring now to FIG. 1 an embodiment of our invention is shown in what is essentially a front perspective view of a particular pouch used as a handcuff case. The case is formed of two sides, a front side 12 and a rear side 14, these sides being folded together and stitched on the edges with a binding 16.

Figure 2A:
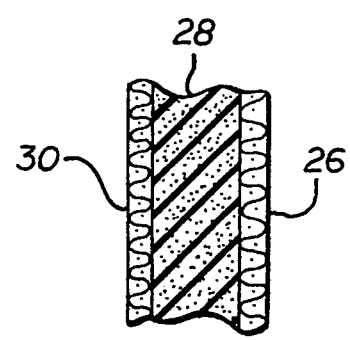
FIG. 2A is an enlarged view of that portion of FIG. 2 marked 2A.
Figure 2:
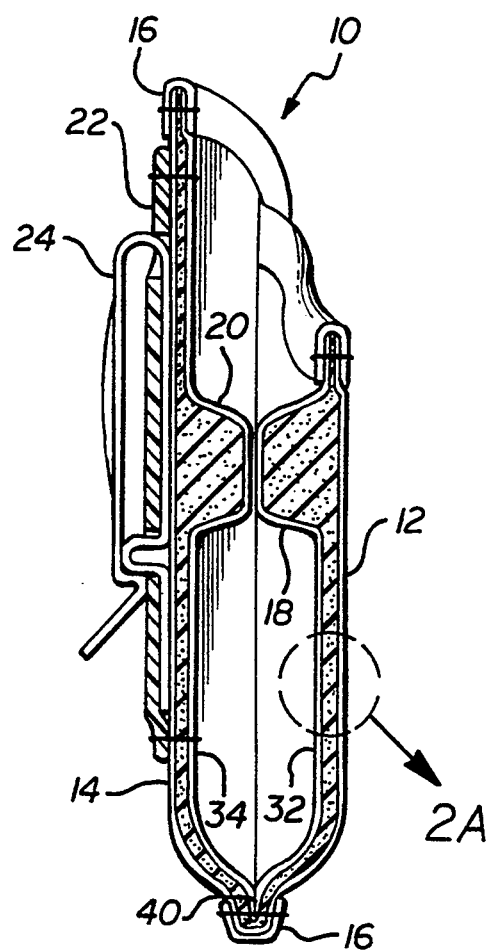
FIG. 2 is a sectional view taken along line 2—2 of FIG. 1.

FIG. 2 is a sectional view taken on line 2—2 of FIG. 1 and shows the pouch 10 with its front side 12 and its rear side 14 and in this view it will be noted that each of these sides includes a large inwardly facing projection, side 12 having a projection 18 and side 14 having a projection 20. Binding 16 is shown where it is sewed across the top of rear side 14 as well as across the side edges and the bottom of pouch 10 where members 12 and 14 are joined. Sewn to the back of rear side 14 is a belt loop panel 22 to which is attached a belt loop member 24.

FIG. 2A shows an enlargement of the portion of front side 12 which is marked 2A in FIG. 2 and which indicates the laminate material including a heavy woven layer 26, a polyfoam layer 28, and a layer 30 of liner fabric.

Figure 3:
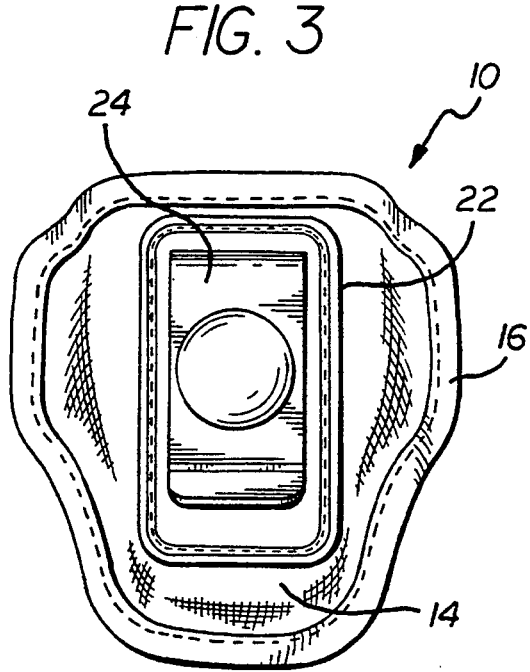
FIG. 3 is a rear plan view of the embodiment of FIG. 1.

FIG. 3 is a rear plan view of the pouch of FIGS. 1 and 2 showing the rear side 14, the binding 16 and the belt loop panel 22 which is stitched to rear side 14. Attached to the belt loop panel 22 is a spring type belt loop 24.

FIG. 4A is a perspective view of a panel of laminate material including an outside layer 26 which will normally be a woven layer of heavy ballistic fabric; on the inside is the polyfoam layer 28 and on the opposite side from layer 26 is the layer 30 of liner material which is normally a fabric having a fairly soft finish as set forth above.

FIG. 4B shows an enlarged section taken through FIG. 4A indicating the particular layers just described.

FIG. 5 is a perspective view of the laminate material of FIG. 4 after being molded to produce the embodiment of FIGS. 1-3. The laminate panel shown in FIG. 4A is placed in a mold and subjected to heat and pressure for a time sufficient to produce a permanent deformation in the material such as that shown in FIG. 5. The mold, depending on its configuration, exerts greater pressure and produces greater deformation or compression of the material, particularly the polyfoam material, in certain areas of the panel. The particular mold used in producing the configuration of FIG. 5 imposes substantial pressure in the center of the inside of each of the front side 12 and the rear side 14 portions of the panel leaving the large cavity in 32 in the front side portion and the similarly large cavity 34 in the rear side portion.

Each such cavity leaves a center island of much less compressed material which are projections 18 and 20, respectively. The compression of areas 32 and 34 result in reducing the effective height of the polyfoam material to a small fraction, perhaps one-fifth, of that which it originally had which is essentially equivalent to the height of projections 18 and 20. These areas also become fairly stiff. The panel is also formed with molded grooves 36 and 38 which substantially define the edges of the front side and the rear side and the material to the outside of these grooves is trimmed away leaving the two sides attached through a short section or hinge 40 in the center of the panel which then becomes the bottom part of the pouch.

The front side 12 and the rear side 14 are then folded over this hinge 40 as shown in FIG. 6. This figure which is very similar to that of FIG. 1 shows a perspective view of the substantially assembled handcuff pouch with the front and rear sides folded together and showing the binding 16 being stitched onto the edges of the front side 12 and the rear side 14.

FIG. 7 is a perspective view of the pouch 10 as viewed mainly from the rear. Sides 12 and 14 are visible as is binding 16. The belt loop panel 22 which carries the belt loop member 24 is in the process of being stitched to the back of rear panel 14.

FIG. 8 is a perspective view of another embodiment of the invention. This figure shows a small case which may be a glove case or a magazine case which is to be carried on, for example, the belt of a police officer and it includes a front panel 42 and a rear panel 44 including a cover 45. There is also a binding 46 which is stitched to the edges of the front and rear panels when they are folded together. A belt loop 48 is fastened to the rear panel 46 and a strip of loop fastening material is stitched to the front panel 42 and is secured at its ends under the binding 46.

FIG. 9 shows the pouch of FIG. 8 in essentially the same perspective but with the cover 45 opened. In this view it will be seen that the cover 45 includes a plurality of horizontal grooves 52 and a panel of hook fastening material 54 which engages the loop fastening material 50 when the pouch is closed. The horizontal grooves 52 serve as a multiple hinge arrangement which, in combination with the large areas of hook and loop fastening material, make it possible to fasten the cover 45 to the loop material 50 at any of several locations, thus providing for some variation in the size of the gloves or the height of the magazines fitting in the pouch.

FIG. 10 is a sectional view taken along line 10—10 of FIG. 9. In this view it will be seen that the pouch includes the front panel 42 and the rear panel 44 which are, as in the case of the pouch 10, continuations of the same initial laminate panel folded over at fold point 56 with the binding 46 sewn through the fold to secure both the fold and the binding. The grooves 52 are formed in essentially the same manner as described above by placing the laminate panel in a mold with heat and pressure applied which effectively causes a permanent deformation of the cover 45 as described. In molding the front side 42, the front face panel 68 is substantially displaced from the edges of front face 42 during the heating and compression process. Polyfoam material in the face 68 as well as in the edges 58, 60 and 68 and the corners 64 and 66 is permanently compressed. As in the case of the embodiment of FIGS. 1-3 the front and back faces are folded over the fold portion 56 and then are subsequently stitched as described. Another section of binding 56 is shown stitched around the upper edge of front panel 42. In the molding process, the front panel 42 is forced into a form resulting in reducing the height of the polyfoam layer and producing clearly defined edges such as those shown in FIG. 9 at numerals 58, 60 and 62. This results also in relatively sharply defined corners such as those shown at numerals 64 and 66. Applicants have attempted to fashion a similar magazine pouch using such prior art methods, but such pouches, although roughly of the same shape as that shown, do not have the defined edges and corners, nor do they have the stiff sides of front panel 42 which results from the compression process described above.

The pouch of FIGS. 8, 9 and 10 is produced by a process essentially the same as that described above with respect to FIGS. 1-3.

Figure 11:
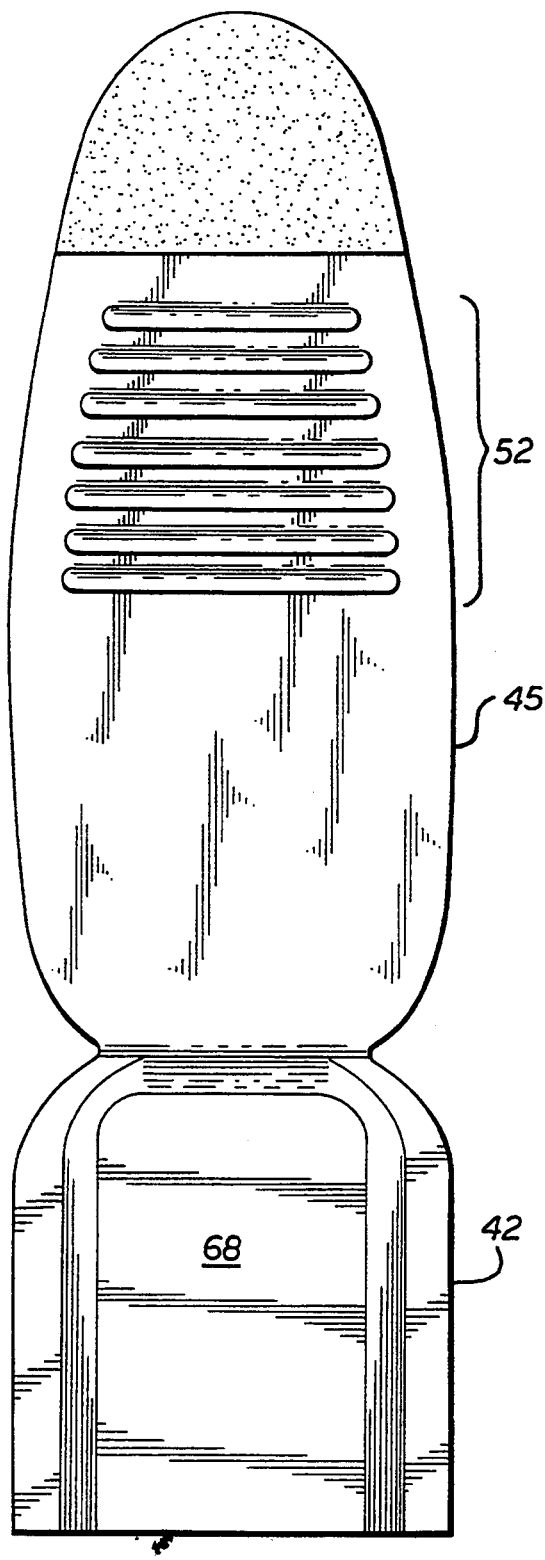
FIG. 11 is a plan view of laminate material such as that of FIG. 4A after being molded and trimmed to produce the embodiment of FIGS. 8, 9 and 10.

FIG. 11 is a plan view of the laminate used to form the pouch of FIGS. 8, 9 and 10, after the compression and heating process and after trimming but before the sides are sewed together. The cover 45 has the transverse grooves 52 formed therein, as shown, and the front panel 42 includes the deep deformation, producing the defined edges and corners and the displaced front face 68, referred to above.

Figure 12:
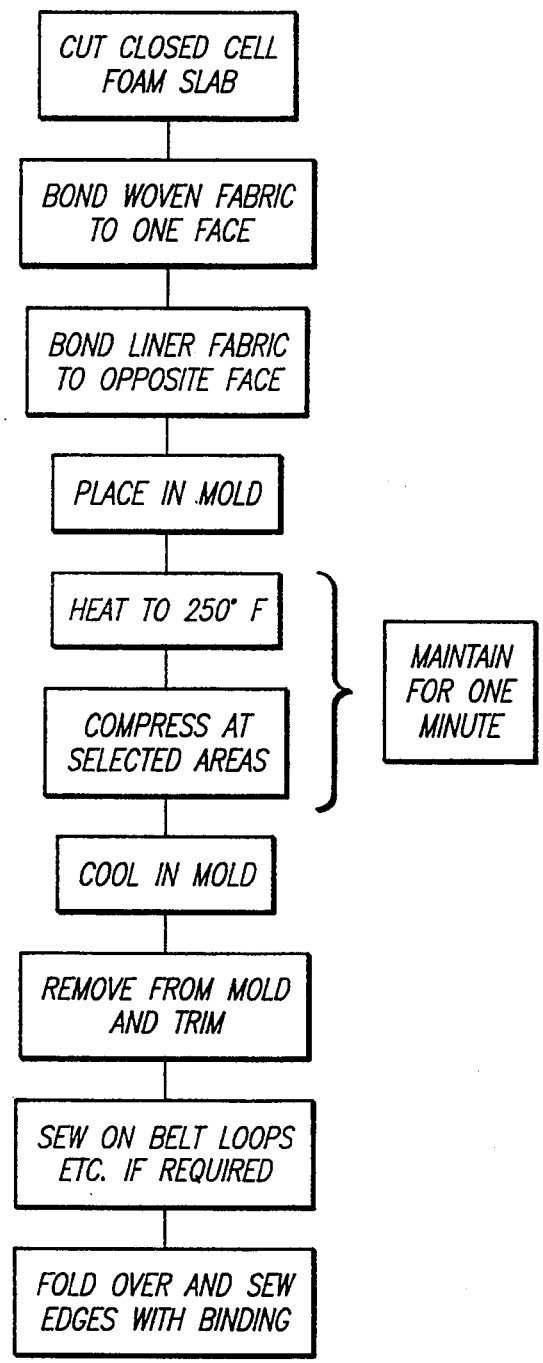
FIG. 12 is a flow chart describing the molding process to produce the molded structures of FIGS. 5 and 11.

This process is described in more detail in the flow diagram of FIG. 12 which describes the process of manufacturing the pouches described above. Although this flow diagram indicates that one might start with a foam slab and individually bond woven fabric to one face and liner fabric to the opposite face, it is also possible to buy the laminate material with these fabrics already installed. Such a laminate is then placed in a mold and heated to temperatures of approximately 250° F. while at the same time the mold compresses the material at selected areas and to varying percentages of the original thickness. In some instances the compression may reduce the effective thickness of the material to one-fifth or somewhat less of its original thickness. This heat and compression process is maintained for approximately one minute after which the laminate is permitted to cool in the mold. Once cooled the formed material is removed from the mold, trimmed as described in connection with FIG. 5, a belt loop stitched to one side, the sides folded over and stitched together as described above. While in the case of the embodiments described above, it is convenient to mold the front and rear faces together, it is recognized that it may, in some cases, be preferable to mold the front and rear panels separately.

While only two embodiments have been described herein it is recognized that the teachings herein are applicable to pouches and containers of a number of configurations and we do not wish to be limited except by the following claims as interpreted with the benefit of the Doctrine of Equivalents.

We claim:

1. A pouch having two sides formed of laminate material including a layer of woven synthetic fabric, a layer of polyfoam and a layer of liner fabric, said layers being bonded together; said laminate material being processed by:
    heating said laminate material to a desired elevated temperature,
    compressing selected areas of said laminate material while in a mold under said temperature and subsequently cooling said laminate material in said mold such that the thickness of said laminate material over said selected areas is substantially reduced, thereby causing said laminate material to be permanently formed with said selected areas of reduced thickness having substantial stiffness, and edges and corners having substantial stiffness;
    wherein said sides each have at least one highly compressed central area and at least one smaller upstanding relatively uncompressed island area in said central area to conform to the size and shape of an object to be covered in said pouch;
    trimming said laminate material to define said sides, each of which has a top edge and other peripheral edges; and
    securing said peripheral edges together.

2. A pouch having two sides formed of laminate material including a layer of woven synthetic fabric, a layer of polyfoam and a layer of liner fabric, said layers being bonded together; said laminate material being processed by:
    heating said laminate material to a desired elevated temperature; and
    compressing selected areas of said laminate material while in a mold under said temperature and subsequently cooling said laminate material in said mold such that the thickness of said laminate material over said selected areas is substantially reduced, thereby causing said laminate material to be permanently formed with said selected areas of reduced thickness having substantial stiffness and edges and corners having substantial stiffness;
    one side of said pouch being made subsequently longer than said other side, the additional length providing a cover, said cover being formed with an inboard part having a plurality of transverse grooves providing a variable foldover hinge and an outboard part having one of loop and hook fastening material fastened thereto, and the other of said loop and hook fastening material being attached to said other side of said pouch;
    trimming said laminate material to define said sides, each of which has a top edge and other peripheral edges; and
    securing said peripheral edges together.

3. A pouch as claimed in claim 2 wherein a belt loop member is stitched to one side thereof.

4. A pouch formed of a laminate material including a layer of woven synthetic fabric, a layer of polyfoam and a layer of liner fabric, said layers being bonded together;
    wherein said laminate material is heated to a temperature of approximately 250° C., and selected areas of said laminate material are compressed in a mold such that said selected areas are substantially reduced in thickness, said heating and compressing steps taking place over a time of approximately one minute, after which said laminate material is cooled in said mold thereby causing said laminate material to be permanently formed with areas of different thickness and wherein selected areas which are compressed are formed into a substantially rigid conformation; said laminate material is then trimmed to provide two opposite sides of said pouch having exposed edges, said sides each having a highly compressed central area and a smaller upstanding island area in said central area; and a binding is fastened around selected edges of said folded laminate material thereby securing the desired two opposite sides together to form said pouch.

5. A pouch as claimed in claim 4 wherein a belt loop member is stitched to one side thereof.

6. A pouch formed of a laminate material including a layer of woven synthetic fabric, a layer of polyfoam and a layer of liner fabric, said layers being bonded together;

wherein said laminate material is heated to a temperature of approximately 250° C., and selected areas of said laminate material are compressed in a mold such that said selected areas are substantially reduced in thickness, said heating and compressing steps taking place over a time of approximately one minute, after which said laminate material is cooled in said mold thereby causing said laminate material to be permanently formed with areas of different thickness and wherein selected areas which are compressed are formed into a substantially rigid conformation; said laminate material is then trimmed to provide two opposite sides of said pouch having exposed edges;

wherein one side of said pouch is made substantially longer than said other side, the additional length providing a cover, said cover being formed with an inboard part having a plurality of transverse grooves providing a variable foldover hinge and an outboard part having one of loop and hook fastening material fastened thereto;

the other of said loop and hook fastening material being attached to said other side of said pouch; and a binding is fastened around selected edges of said folded laminate material thereby securing the desired two opposite sides together to form said pouch.

7. A pouch for carrying an article having two sides, each formed of a laminate material including a layer of woven synthetic fabric, a layer of polyfoam and a layer of liner material, said laminate material having been molded under heat and pressure to form uncompressed areas and an area of substantially reduced thickness including areas of substantially rigid conformation, and corners and edges of permanent conformation and substantial stiffness, said laminate material being placed together to provide said two sides; and a binding fastened around the periphery of said two sides where desired attaching said sides together.

8. A pouch as claimed in claim 7 wherein one of said two sides is substantially longer than the other, the additional length providing a cover, one of loop and hook fastening material fastened to said cover, and the other of said loop and hook fastening material being attached to said other side of said pouch.

9. A pouch as claimed in claim 8 wherein said cover is formed with a plurality of transverse grooves providing a variable foldover hinge.

10. A pouch as claimed in claim 7 wherein at least one of said two sides includes a compressed central area and a smaller upstanding island area in said central area.

11. A pouch having two sides formed of molded laminate material including a layer of woven synthetic fabric, a layer of polyfoam and a layer of liner fabric, said layers being bonded together;

selected areas of said molded laminate material being compressed under elevated temperature such that the thickness of said molded laminate material over said selected areas is substantially reduced, thereby causing said molded laminate material to be permanently formed with selected non-peripheral areas of reduced thickness having substantial stiffness, and edges and corners having substantial stiffness;

said laminate material being trimmed to define said sides, each of which has a top edge and other peripheral edges; and means fastening said peripheral edges together.

12. A pouch as claimed in claim 11 wherein one of said two sides is substantially longer than the other, the additional length providing a cover, one of loop and hook fastening material fastened to said cover; and the other of said loop and hook fastening material being attached to said other side of said pouch.

13. A pouch as claimed in claim 12 wherein said cover is formed with a plurality of transverse grooves providing a variable foldover hinge.

14. A pouch as claimed in claim 11 wherein said means for fastening said peripheral edges together includes a binding covering said peripheral edges and stitch means securing said binding to said peripheral edges.

15. A pouch as claimed in claim 11 wherein at least one of said two sides includes a compressed central area and a smaller upstanding island area in said central area.

* * * * *

UNITED STATES PATENT AND TRADEMARK OFFICE
CERTIFICATE OF CORRECTION

PATENT NO. : 5,351,868

DATED : Oct. 4, 1994

INVENTOR(S) : Robert J. Beletsky; Anthony G. Lefeber; John J. Chase; Gary M. Paudler It is certified that error appears in the above-identified patent and that said Letters Patent is hereby corrected as shown below:

Col. 6, line 42:

Claim 2, line 17, delete "subsequently: and insert ---substantially---.

Col. 6, line 61:

Claim 4, line 5, change "250° C." to ---250° F.---.

Col. 7, line 18:

Claim 6, line 5, change "250°C." to ---250° F."---.

Signed and Sealed this

Twentieth Day of February, 1996

Attest:

BRUCE LEHMAN

*Attesting Officer*

Commissioner of Patents and Trademarks